Patented Aug. 19, 1952

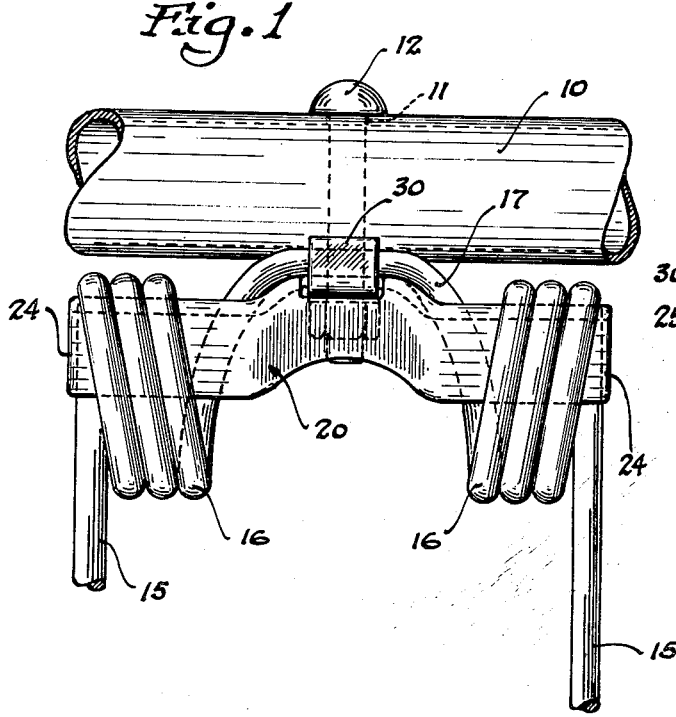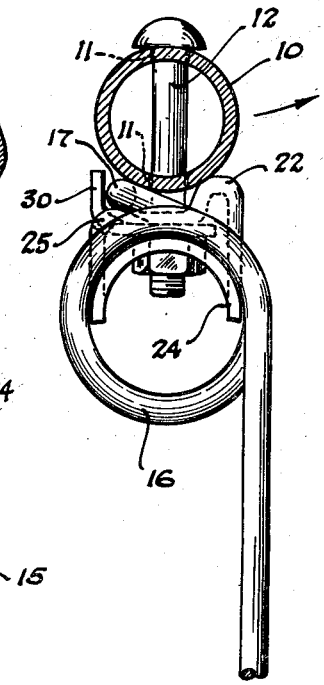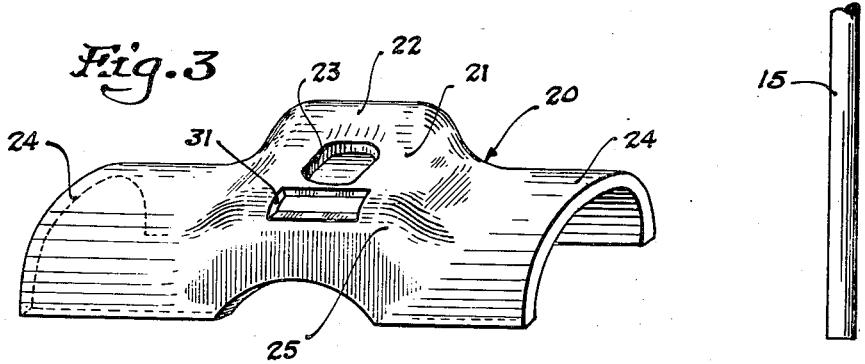

2,607,183

UNITED STATES PATENT OFFICE 2,607,183

RAKE TOOTH MOUNTING DEVICE

Melvin J. Happe, New Holland, and Allan R. Redrow, Lancaster, Pa., assignors to New Holland Machine Division of The Sperry Corporation, New Holland, Pa., a corporation of Delaware Application November 2, 1950, Serial No. 193,684

6 Claims. (Cl. 56—400)

This invention relates to means for mounting the teeth on a rake and more particularly to an improvement for holding raking teeth means on the raking bars carried by the rotating reel of a side delivery rake or the like.

Many structures have been provided in the past for holding the raking teeth on the raking bars of a side delivery rake and the present invention is an improvement on these structures which provides a simplified clamp and support for this purpose.

The invention suggests the use of substantially rigid bearing means a plurality of which may be mounted on the rake bar for holding a corresponding number of rake teeth means affixed against the underside thereof. Each tooth means is adapted to be readily fitted over an individual bearing or clamping means and the assembly can be removably attached to the rake bar so as to hold the teeth fixed in a proper raking position. The support and raking teeth means forming the subject of this invention are adapted to serve equally as well for either raking or tedding. Also when any one of the tooth means is broken, the unit may be quickly replaced so that the efficiency of the side rake need never be seriously impaired.

The preferred form of the invention is shown in the drawings wherein:

Figure 1 is a rear elevation of tooth means and its bearing support assembled on the rake bar.

Figure 2 is an end elevation of the structure shown in Figure 1; and,

Figure 3 is an enlarged perspective view of the body forming the bearing or support means for a raking tooth.

The invention is shown in the drawings removably affixed to a section of a rake bar such as might be used on the rotating reel of a side delivery rake and for this purpose, rake bar 10 has a series of holes 11 formed therein through which the bolts 12 are adapted to be passed. The bolts 12 are carried by the rake bar and serve to bind the rake teeth and their bearing or supporting means, firmly against the underside of the rake bar.

Each of the rake teeth means may be and preferably is made from a single length of spring steel wire and the free ends form the actual teeth that are adapted to engage the crop being worked upon. The intermediate portion of each of the tooth means has a pair of horizontal coil spring sections 16 that are joined together by the central bridge portion 17. Each of the tooth means is adapted to be held against the under side of the rake bar 10 with the central bridge portion 17 of the tooth pressed tightly against the bar.

A number of bearing or supporting bodies 20 are provided each one being adapted to cooperate with an individual tooth means and having a raised or off-set center section that has a seat portion 22 adapted to be engaged against the under side of the rake bar. The off-set center has an aperture 23 formed therein through which the bolt 12 may be passed to secure the support body against the rake bar. The bearing support body 20 also has a pair of wing elements 24 integral therewith which are rounded to a curvature somewhat less than the internal diameter of the coil springs so that they may be set within the coil spring sections 16 of the tooth means to provide a support over which the rake teeth 15 bend and about which the springs 16 contract as the teeth are loaded during the raking operation.

It will be noted that the body 20 and the rake teeth means are interfitted together and may be mounted as an assembly on the underside of the rake bar. The coil springs 16 are temporarily sprung apart and slipped into position over the wings 24 and the bridge portion 17 at the center of the tooth means is snapped over the rear shoulder 25 formed by the offsetting of the center of the support body. These two elements are designed to fit together so that when the up-set shoulder 22 is drawn tight against the underside of the rake bar, the center bridge portion 17 is clamped tightly between shoulder 25 and the under side of the rake bar and the wings 24 are fixedly aligned with the longitudinal axis of the raking bar in a position to lightly bear upwardly against the inside of the coil springs 16.

When rotation of the raking reel is reversed and the side delivery rake is to be used for tedding, the clip 30 may be provided to insure the locking of the central bridge portion 17 behind the shoulder 25 as will appear more fully below. The clip 30 is generally L shaped and one leg of the L is adapted to fit through aperture 31 provided in the rear side of the off-center section of the support body. The said one leg of clip 30 is also provided with a hole in line with the holes 11 and 23 so that the clip may be engaged over bolt 12 whereby it is held in assembled relation.

When the composite structure is assembled the rake bar may be driven forwardly with the rake reel to perform the desired raking operation as indicated by the arrow in Figure 2. The rake teeth 15 are thus driven against the crop and the teeth bend around supporting wings 24 so that springs 16 become stressed. The tooth means however, are confined against movement other than their springing action because the center bridge portions 17 of the respective tooth means are trapped against the underside of the rake bar and cannot move.

During tedding, the directing of the movement of the rake bar is reversed and the rake teeth 15 tend to unwind the springs 16 that are carried on the supporting wings 24. The center bridge portions 17 of the several tooth means are each urged to press down tightly against the shoulders 25 on the support bodies and in some instances might spring over the shoulder except for the restraint produced by the clip 30.

The description given above covers the preferred form of this invention, however, it is obvious that many modifications thereof occur to those skilled in the art which will follow within the scope of the following claims:

We claim:

1. In combination with a cylindrical rake reel bar, a bolt extending substantially diametrically through said bar, a tooth supporting and clamping member carried on one end of said bolt and having a raised projection parallel to the axis of the bar engaging the bar on one side of the common axial plane of said bolt and bar, said member including wings extending from its opposite ends in spaced parallel relation to the bar, a resilient rake tooth structure including a pair of coil springs axially receiving and supported on said respective wings, raking teeth carried by the respective coil springs, an integral bridge portion connecting the adjacent ends of said springs, said bridge portion extending around said bolt between the bar and the member and engaging both on the side of said common axial plane opposite from said projection, whereby the clamping action of the bolt as same is drawn tight is divided between said projection and said bridge portion, both of which cooperate to maintain the wings in spaced parallel relation to the bar and against angular movement around the bolt.

2. In combination with a cylindrical rake reel bar, a bolt extending substantially diametrically through said bar, a tooth supporting and clamping member carried on one end of said bolt and having a raised projection parallel to the axis of the bar engaging the bar on one side of the bolt, said member including wings extending from its opposite ends in spaced parallel relation to the bar, a resilient rake tooth structure including a pair of coil springs axially receiving and supported on said respective wings, raking teeth carried by the respective coil springs, an integral bridge portion connecting said springs, said bridge portion extending around said bolt between the bar and the member and engaging both on the side of said bolt opposite from said projection, whereby the clamping action of the bolt is divided between said projection and said bridge portion both of which cooperate to maintain the wings in spaced parallel relation to the bar and against angular movement around the bolt.

3. In combination with a substantially cylindrical rake reel bar, a bolt extending substantially diametrically through said bar, a tooth supporting and clamping member carried on one end of said bolt and having a raised projection engaging the bar on one side of the bolt, said member including wings extending from its opposite ends in spaced substantially parallel relation to the bar, a resilient rake tooth structure including a pair of coil springs axially receiving and supported on said respective wings, an integral bridge portion connecting said springs, said bridge portion extending around said bolt between the bar and the member and engaging both on the side of said bolt opposite from said projection.

4. In combination with a substantially cylindrical rake reel bar, a bolt extending substantially diametrically through said bar, a tooth supporting and clamping member carried on one end of said bolt and having a raised projection engaging the bar on one side of the bolt, said member including a wing extending from its opposite ends in spaced substantially parallel relation to the bar, a resilient rake tooth structure including a pair of coil springs axially receiving and supported on said respective wings, an integral bridge portion connecting said springs, said bridge portion extending around said bolt between the bar and the member and engaging both on the side of said bolt opposite from said projection.

5. In combination with a substantially cylindrical rake reel bar, a bolt extending substantially diametrically through said bar, a tooth supporting and clamping member carried on one end of said bolt and having a raised projection engaging the bar on one side of the bolt, said member including a wing extending in spaced parallel relation to the bar, a resilient rake tooth structure including a coil spring axially receiving and supported on said wing, an integral arm portion of the spring projecting outwardly therefrom and extending between the bar and the member on the side of said bolt opposite from said projection.

6. The combination defined in claim 2, including a removable clip mounted on said bolt, said clip extending beneath said bridge portion and having an abutment engaging said bridge portion on the side thereof remote from said bolt, to prevent rotary movement of said bridge portion away from the bolt, said member having portions disposed for engagement with opposite side edges of the clip to prevent angular movement of the clip around the bolt.

MELVIN J. HAPPE.
ALLAN R. REDROW.

REFERENCES CITED

The following references are of record in the file of this patent:

UNITED STATES PATENTS

| Number | Name | Date |
| --- | --- | --- |
| 244,805 | Hall | July 26, 1881 |
| 1,145,963 | Bame | July 13, 1915 |
| 1,978,717 | Oppenheim | Oct. 30, 1934 |
| 2,171,025 | Crumb et al. | Aug. 29, 1939 |
| 2,237,002 | Kelley | Apr. 1, 1941 |
| 2,364,303 | Martin | Dec. 5, 1944 |
| 2,432,653 | Bloom | Dec. 16, 1947 |